US011938359B2

(12) United States Patent
Meyer et al.

(10) Patent No.: US 11,938,359 B2
(45) **Date of Patent: *Mar. 26, 2024**

(54) CONCEALABLE WINDOW SPRINKLER

(71) Applicant: Victaulic Company, Easton, PA (US)

(72) Inventors: Stephen J. Meyer, Chester Springs, PA (US); Thomas Wancho, Bethlehem, PA (US); Thomas Sandberg, Phillipsburg, NJ (US); John Desrosier, Plymouth, MA (US); Kevin Desmond Maughan, North Kingstown, RI (US)

(73) Assignee: VICTAULIC COMPANY, Easton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,909

(22) Filed: Dec. 1, 2022

(65) Prior Publication Data

US 2023/0103174 A1 Mar. 30, 2023

Related U.S. Application Data

(63) Continuation of application No. 17/199,565, filed on Mar. 12, 2021, which is a continuation of application
(Continued)

(51) Int. Cl.
*A62C 37/09* (2006.01)
*A62C 37/11* (2006.01)
(Continued)

(52) U.S. Cl.
CPC .............. *A62C 37/09* (2013.01); *B05B 1/265* (2013.01); *B05B 1/267* (2013.01); *A62C 37/11* (2013.01); *A62C 37/14* (2013.01)

(58) Field of Classification Search
CPC ......... A62C 37/09; A62C 37/11; A62C 37/14; B05B 1/265; B05B 1/267
See application file for complete search history.

(56) References Cited

U.S. PATENT DOCUMENTS

| | | | |
|---|---|---|---|
| 4,014,388 | A | 3/1977 | Anderson |
| 4,880,063 | A | 11/1989 | Leininger et al. |

(Continued)

FOREIGN PATENT DOCUMENTS

| | | | |
|---|---|---|---|
| AU | 2007215183 | A1 | 8/2007 |
| CN | 101426585 | A | 5/2009 |

(Continued)

OTHER PUBLICATIONS

Int'l Search Report and Written Opinion dated Aug. 3, 2020 in Int'l Application No. PCT/US2020/030961.

(Continued)

*Primary Examiner* — Darren W Gorman
(74) *Attorney, Agent, or Firm* — Panitch Schwarze Belisario & Nadel LLP

(57) ABSTRACT

A concealable sprinkler head includes a frame having a body mountable to a fire suppression liquid source, a pair of frame arms and a pair of corresponding drop pins slidably engaged with a respective frame arm. A thermal trigger is supported within the sprinkler frame. A fluid deflector is secured to the drop pins and includes a generally horizontal surface. The drop pins extend substantially orthogonally from the horizontal surface. An inclined surface of the fluid deflector extends angularly upwardly from the horizontal surface. A concealing cup surrounds the frame arms. A cover plate is attached to the concealing cup, covering the distal end thereof, wherein the drop pins and the deflector are positioned within the concealing cup. The cover plate is removable from the concealing cup permitting the drop pins and the deflector to axially slide out of the concealing cup into an operational position.

18 Claims, 13 Drawing Sheets

Related U.S. Application Data

No. 16/865,012, filed on May 1, 2020, now Pat. No. 11,027,161.

(60) Provisional application No. 62/841,592, filed on May 1, 2019.

(51) Int. Cl.
*B05B 1/26* (2006.01)
*A62C 37/14* (2006.01)

(56) References Cited

U.S. PATENT DOCUMENTS

| | | | | | |
|---|---|---|---|---|---|
| 5,152,344 | A | | 10/1992 | Fischer et al. | |
| 5,372,203 | A | * | 12/1994 | Galaszewski | A62C 37/14 169/37 |
| 5,810,263 | A | * | 9/1998 | Tramm | B05B 1/265 239/518 |
| 6,082,463 | A | * | 7/2000 | Ponte | A62C 37/09 169/41 |
| 6,152,236 | A | | 11/2000 | Retzloff et al. | |
| 7,275,603 | B2 | | 10/2007 | Polan | |
| 7,784,555 | B2 | | 8/2010 | Pahila | |
| 8,353,356 | B2 | | 1/2013 | Rogers | |
| 8,573,316 | B2 | | 11/2013 | Polan et al. | |
| 8,646,539 | B2 | | 2/2014 | Abels et al. | |
| 9,149,818 | B1 | | 10/2015 | Orr | |
| 9,630,039 | B2 | * | 4/2017 | Koiwa | B25B 13/02 |
| 9,694,222 | B2 | | 7/2017 | Hansen | |
| 9,782,614 | B2 | * | 10/2017 | Chen | A62C 35/68 |
| 9,821,182 | B2 | | 11/2017 | Chen | |
| 10,843,209 | B1 | | 11/2020 | Hackett et al. | |
| 11,577,107 | B2 | | 2/2023 | Hackett et al. | |
| 2006/0102362 | A1 | | 5/2006 | S. Polan | |
| 2008/0073088 | A1 | | 3/2008 | Ide et al. | |
| 2009/0126950 | A1 | | 5/2009 | Rogers | |
| 2010/0243283 | A1 | * | 9/2010 | Green | B05B 1/265 169/56 |
| 2010/0263883 | A1 | | 10/2010 | Abels et al. | |
| 2011/0030977 | A1 | | 2/2011 | Polan et al. | |
| 2011/0203814 | A1 | * | 8/2011 | Thompson | A62C 37/09 169/56 |
| 2013/0341054 | A1 | * | 12/2013 | Polan | A62C 35/58 169/37 |
| 2015/0224351 | A1 | | 8/2015 | Chen | |
| 2016/0003877 | A1 | | 1/2016 | Kishi et al. | |
| 2016/0038777 | A1 | | 2/2016 | Abels et al. | |
| 2017/0296852 | A1 | | 10/2017 | Pipe | |
| 2017/0319884 | A1 | | 11/2017 | Oldham | |
| 2021/0069535 | A1 | | 3/2021 | Hackett et al. | |
| 2021/0101161 | A1 | | 4/2021 | Hackett et al. | |
| 2021/0308699 | A1 | | 10/2021 | Drake | |
| 2022/0088426 | A1 | | 3/2022 | Hackett et al. | |

FOREIGN PATENT DOCUMENTS

| | | | |
|---|---|---|---|
| CN | 103429300 | A | 12/2013 |
| CN | 105435405 | A | 3/2016 |
| RU | 2452543 | C2 | 6/2012 |
| WO | 2020180382 | A1 | 9/2020 |

OTHER PUBLICATIONS

Fire Protection Products—Automatic Sprinklers, V27, K5.6, Specific Application Window Sprinkler Standard Spray, Pendent, Models S/S.I.N. V2752 Quick Response, 6 pages, 2013.

Model CWS Specific Application Concealed Pendent Vertical Sidewall Windo Sprinkler 5.6 K-factor, Tyco, 8 pages, 2019.

Office Action dated Jul. 20, 2022 in Chinese Application No. 202080044265.

Office Action dated Apr. 8, 2023 in CN Application No. 202080044265.5.

Office Action dated Dec. 9, 22 in CO Application No. NC2021/0015948.

Extended European Search Report dated Mar. 2, 2023 in EP Application No. 20798670.4.

Written Opinion dated Apr. 24, 2023 in SG Applciaton No. 11202111917R.

Search Report dated Apr. 20, 2023 in SG Application No. 11202111917R.

Office Action dated Jun. 19, 2023 in IL Application No. 287603.

Model WSTM Specific Application Window Sprinklers ™5.6 K-factor—Quick Response Vertical Sidewall & Horiz. Sidewall Glass Bulb Automatic Sprinkler; Tyco Fire Products; Aug. 31, 2018.

Office Action dated Jun. 29, 2023 in CO Application No. NC2021/0015948 .

Reliable® Model WP Specific Application Window Sprinklers; Bulletin 181; Apr. 2023; 14 pages.

Viking Technical Data; Specific Application Window Sprinklers (K5.6); Form No. F_111218; Nov. 18, 2015; Rev 18.1 (19 pages); (admitted prior art at least as of Apr. 30, 2019).

Viking® Technical Data; Model C-1 Window Sprinklers; Form No. F_051800; Nov. 18, 2005; Rev P65 (6 pages); (admitted prior art at least as of Apr. 30, 2019).

Office Action dated Sep. 13, 2023 in U.S. Appl. No. 17/199,565.

Office Action dated Sep. 14, 2023 in RU Application No. 2021135018.

Search Report dated Sep. 14, 2023 in RU Application No. 2021135018.

Office Action dated Oct. 25, 2023 in CN Application No. 2020800442655.

Reliable® Model WP56 and WP56L Specific Application Window Sprinklers, Bulletin 181, Feb. 2020 (prior art at least as of Apr. 30, 2019).

* cited by examiner

CONCEALABLE WINDOW SPRINKLER

CROSS-REFERENCE TO RELATED APPLICATIONS

This application is a continuation of co-pending U.S. patent application Ser. No. 17/199,565 titled "Concealable Window Sprinkler", filed on Mar. 12, 2021, which claims the benefit of U.S. patent application Ser. No. 16/865,012, titled "Concealable Window Sprinkler", filed on May 1, 2020 and issued as U.S. Pat. No. 11,027,161 on Jun. 8, 2021, which claims priority from U.S. Provisional Patent Application No. 62/841,592, titled "Concealable Window Sprinkler", filed on May 1, 2019, the entire contents of each of which are incorporated by reference herein.

BACKGROUND OF THE DISCLOSURE

The present disclosure is generally directed to window sprinklers, and, particularly, concealable window sprinklers.

In many buildings, such as high-rise buildings, building and/or fire codes require that certain walls or partitions are required to be fire rated walls or partitions which are able to maintain their integrity for at least a minimum amount of time (e.g., but not limited to, two hours) during a fire event in the building. Glazing may be used for either the entirety or a portion of the wall, typically for aesthetic reasons. One conventional method for achieving the fire rating when using glazing is to glaze the windows using a "fire-rated" glazing. Doing so, however, is costly, as fire-rated glazing may cost $300-$600 per square foot.

As an alternative, a window sprinkler system, such as shown in FIG. 1, may be employed. A sprinkler head 1 may be attached to a vertical pipe 3, to spray water onto window 2. As shown in the example of FIG. 1, a typical sprinkler head 1 may be attached to the vertical pipe 3 via an elbow (or tee) joint 4 in order to properly orient the sprinkler head deflector 8 relative to the window 2. Alternatively, a sprinkler head 1 may have a vertical orientation and may be attached directly to the vertical pipe 3. In both cases, directional deflectors may be used to ensure that the water is sprayed primarily onto the window 2, rather than omnidirectionally. However, a negative aspect of such a system is that it is not aesthetically pleasing. As a result, either this unpleasing view is tolerated, or soffits 5 may be built to conceal the sprinklers at the windows. The latter gives rise to increased cost, a potential reduction in response time, as well as a reduction in visible window area.

In view of the drawbacks of the previously described approaches, it would be advantageous to manufacture a more aesthetically pleasing window sprinkler having a concealable sprinkler head, foregoing the need for soffits.

BRIEF SUMMARY OF THE DISCLOSURE

Briefly stated, one aspect of the present disclosure is directed to a concealable sprinkler head. The sprinkler head includes a sprinkler frame having a body mountable to a fire suppression liquid source, the body defining a proximal inlet, a distal outlet and an internal fire suppression liquid passageway extending therethrough. A pair of frame arms axially extend away from the body and a pair of corresponding drop pins are each being slidably engaged with a respective frame arm. A thermal trigger is supported within the sprinkler frame and configured to support a sealing plug in a sealing position to seal the internal fire suppression liquid passageway and maintain the sprinkler head in a non-spraying state. Activation of the thermal trigger releases the sealing plug from the sealing position. A directional fluid deflector is secured to the pair of drop pins and includes a generally horizontal surface. The pair of drop pins extend substantially orthogonally from the horizontal surface. An inclined surface of the fluid deflector extends angularly upwardly from the horizontal surface toward the sprinkler frame. A concealing cup is included, which has a generally horizontal upper wall attached to, and horizontally outwardly projecting from, the body of the sprinkler frame. A skirting side wall extends axially distally therefrom and terminates in an open base end. The pair of frame arms are positioned within the concealing cup. A cover plate is attached to the concealing cup, covering the open distal end of the concealing cup and maintaining the sprinkler frame in a compressed, non-activated position, wherein the pair of drop pins and the deflector are positioned within the concealing cup. The cover plate is removable from the concealing cup at a predetermined temperature, permitting the pair of drop pins and the deflector to axially slide out of the concealing cup through the open distal end thereof into an extended operational position.

Another aspect of the present disclosure is directed to a concealable sprinkler head in combination with a space having a ceiling and a glass containing partition wall or window within the space and oriented substantially perpendicularly to the ceiling. The concealable sprinkler head is mounted in the ceiling and positioned between approximately four inches and approximately twelve inches away from the glass containing partition wall or window. The sprinkler head includes a sprinkler frame having a body mountable to a fire suppression liquid source, the body defining a proximal inlet, a distal outlet and an internal fire suppression liquid passageway extending therethrough. A pair of frame arms axially extend away from the body and a pair of corresponding drop pins are each being slidably engaged with a respective frame arm. A thermal trigger is supported within the sprinkler frame and configured to support a sealing plug in a sealing position to seal the internal fire suppression liquid passageway and maintain the sprinkler head in a non-spraying state. Activation of the thermal trigger releases the sealing plug from the sealing position. A directional fluid deflector is secured to the pair of drop pins and includes a generally horizontal surface. The pair of drop pins extend substantially orthogonally from the horizontal surface. An inclined surface of the fluid deflector extends angularly upwardly from the horizontal surface toward the sprinkler frame. A concealing cup is included, which has a generally horizontal upper wall attached to, and horizontally outwardly projecting from, the body of the sprinkler frame. A skirting side wall extends axially distally therefrom and terminates in an open base end. The pair of frame arms are positioned within the concealing cup. A cover plate is attached to the concealing cup, covering the open distal end of the concealing cup and maintaining the sprinkler frame in a compressed, non-activated position, wherein the pair of drop pins and the deflector are positioned within the concealing cup. The cover plate is removable from the concealing cup at a predetermined temperature, permitting the pair of drop pins and the deflector to axially slide out of the concealing cup through the open distal end thereof into an extended operational position.

BRIEF DESCRIPTION OF THE DRAWINGS

The following detailed description of aspects of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
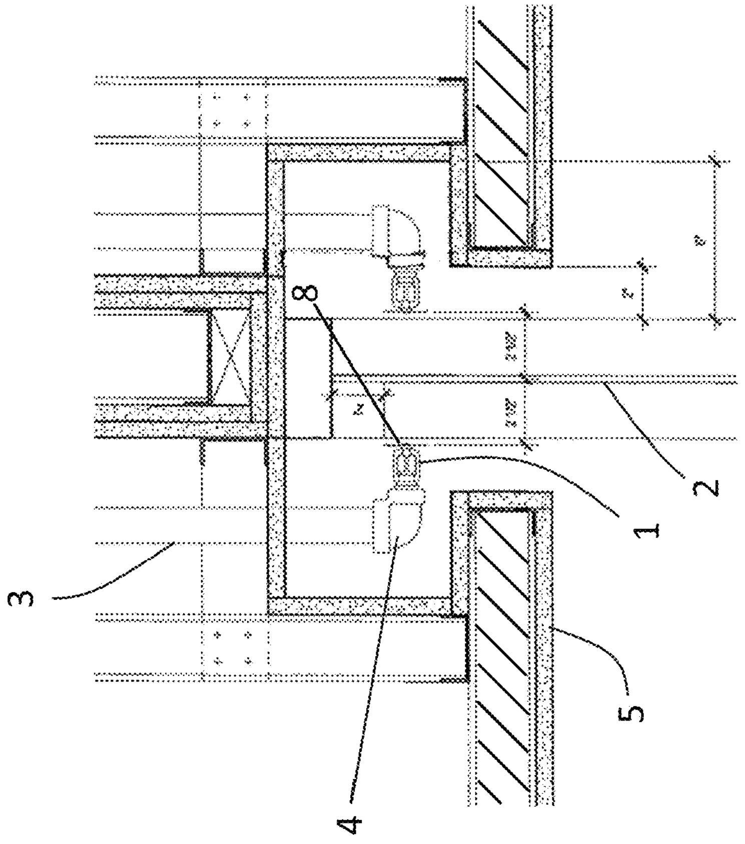
FIG. 1 Prior Art
FIG. 1 is a side elevational view, partially in cross section, of a conventional window sprinkler system installation.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of a sprinkler head, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 2:
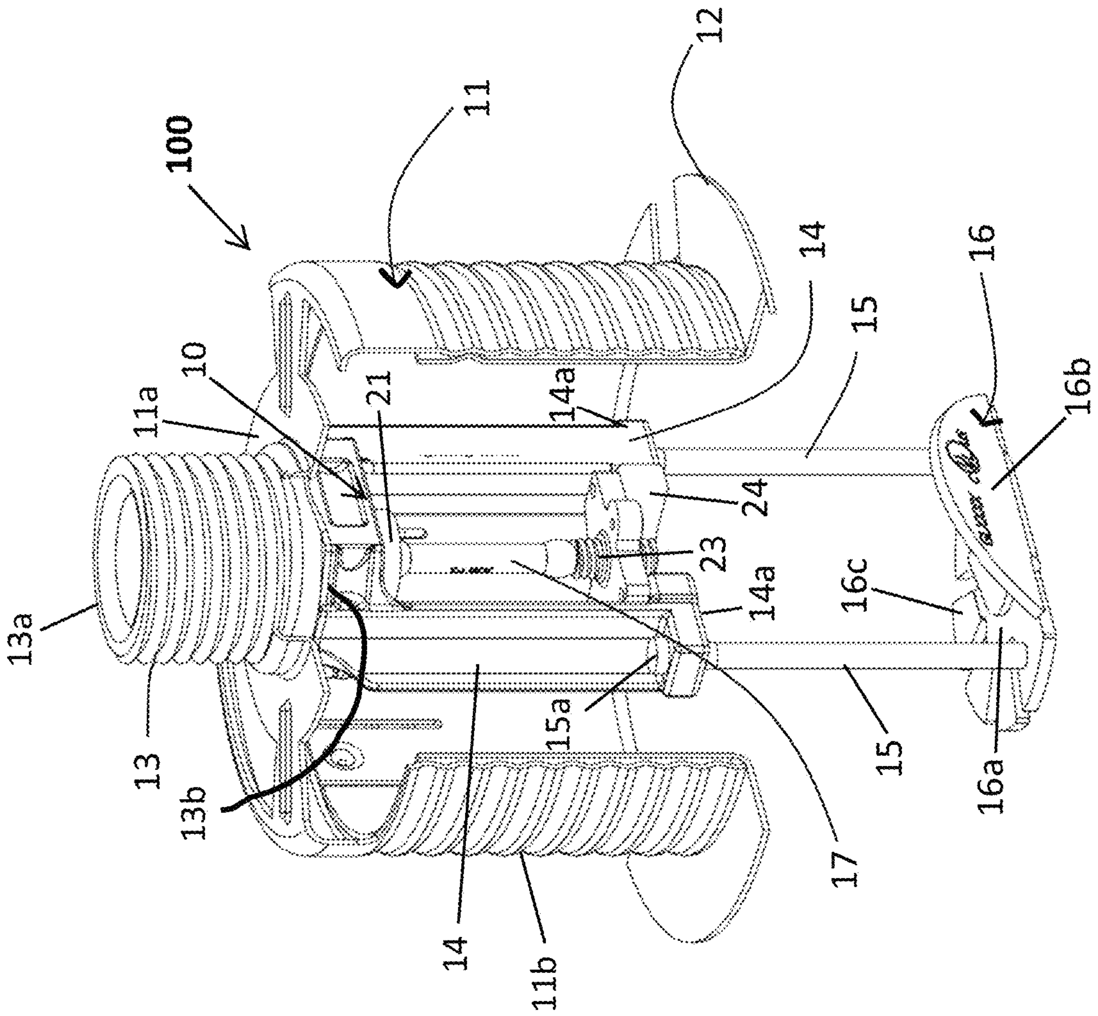
FIG. 2 is a top and side perspective cutaway view of a portion of a concealable sprinkler head oriented in an extended operational position, according to a first embodiment of the disclosure.
Figure 3:
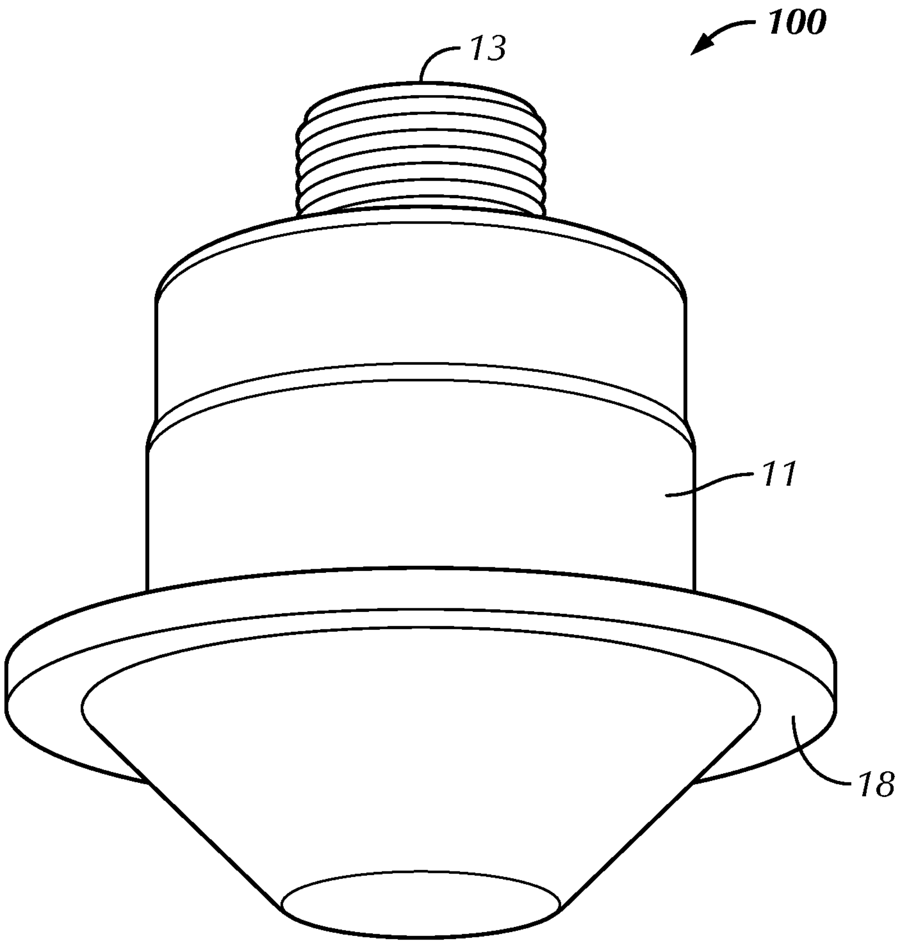
FIG. 3 is a bottom and side perspective view of the concealable sprinkler head of FIG. 2 with a frusto-conical removable cover, in a compressed, non-activated position.

Referring to the drawings in detail, wherein like numerals indicate like elements throughout, there is shown in FIGS. 2-6B a concealable sprinkler head 100, in accordance with a first embodiment of the present disclosure. As shown in FIGS. 2 and 3, the sprinkler head 100 includes a sprinkler frame 10, a fluid deflector 16, a heat sensor/thermal trigger (i.e., heat-sensitive element) 17 supporting a sealing plug/cap 21 to seal the sprinkler head 100 in an unactuated, i.e., no-spray, configuration, a concealing cup 11 and a removable cover plate 18. The sprinkler frame 10 includes a body 13 defining a proximal inlet 13*a*, a distal outlet 13*b* and an internal fire suppression liquid passageway extending therethrough. The thermal trigger 17 holds the sealing plug 21 in place against the distal outlet 13*b* of body 13. The inlet water passageway receives at least a portion of the sealing plug 21. The body 13, which may be threaded, is configured to mount the sprinkler head 100, e.g., threadedly, to a pipe 3 (see FIG. 6A) or other fluid source to receive water therefrom and through the internal fire suppression liquid passageway within the body 13. It is noted that concealable sprinkler head 100 may be oriented in an axially vertical direction (pendent position), e.g., with the body 13 at the top and the deflector 16 at the bottom, and deflector 16 may be designed to direct the fluid spray in a substantially horizontal direction (although this is not limiting, and the direction may vary from a purely horizontal direction, e.g., per design considerations).

Two frame arms 14 are radially or diametrically opposed about the body 13 and extend axially therefrom (substantially within the concealing cup 11) toward the deflector 16. A compression screw 23, or the like, secures the thermal trigger 17 upon the sealing plug 21, in a manner well understood by those of ordinary skill in the art. In the illustrated embodiment, the thermal trigger 17 takes the form of a glass-bulb type trigger, but the disclosure is not so limited and also includes solder links or fusible linkages as known to those of ordinary skill in the art. As should be understood, upon activation of the thermal trigger 17, e.g., shattering of the glass bulb, the sealing plug 21 is forced out by the upstream pressurized water from the pipe 3 and deflected away. The water sprays out from the water passageway in the body 13 and impacts the deflector 16 for distribution thereof in a desired spray pattern according to the design of the deflector 16, e.g., directed onto the window 2. As will be described in further detail below, the deflector 16 may be designed to direct water/fluid in a particular direction, including so as to spray onto a window 2. When heated to or above a predetermined temperature, the thermal trigger 17 may shrink, break, or otherwise separate, thus releasing the pressure keeping the sealing plug 21 in place, and thereby permitting the water (or other fluid) to flow onto the deflector 16. In one non-limiting configuration, the glass bulb 17 has a temperature rating, i.e., the temperature at which the glass bulb 17 shatters, between approximately 125° F. and approximately 225° F., such as, for example, approximately 155° F. and 200° F. In one non-limiting configuration the sprinkler head 100 is configured to operate at a water pressure between approximately 7 psi and approximately 300 psi, such as, for example, between approximately at 10 psi and approximately 175 psi.

As shown best in FIG. 2, the frame arms 14 extend axially away from the body 13, substantially parallel to one another, to respective terminal ends 14*a*. A crossbar 24 extends between and connects the terminal ends 14*a*. In one non-limiting configuration, the cross-bar 24 may define a first section upon the terminal end 14*a* of a frame arm 14, a second section upon the terminal end 14*a* of the other frame arm 14, and a U-shaped third section therebetween, defining a U-shaped opening between the terminal ends 14*a* of the frame arms 14. The U-shaped opening is generally in axial registry with the water passageway extending through the body 13.

Deflector supports 15 (which may also be referred to as "drop pins") are in slidable engagement with the frame arms 14, respectively, and support the deflector 16. In a compressed, non-activated position of the sprinkler head 100, as shown in FIG. 4B, the drop pins 15 are telescopically withdrawn and/or retracted into the frame arms 14, and the deflector 16 is positioned proximate the crossbar 24. As shown in FIG. 4B, the deflector 16' may be flush or nearly flush with a distal end of concealing cup 11. The deflector 16' shown in FIG. 4B takes the form of an omnidirectional deflector and is illustrated primarily as a representation of where a deflector 16 may be positioned in the compressed, non-activated position. In an extended operational position of the sprinkler head 100, as shown in FIG. 2, the drop pins 15 and the deflector 16 are slidably extended/dropped down, i.e., slide down the frame arms 14, via respective apertures in the terminal ends 14*a* of the frame arms 14, such that a proximal collar 15*a* of each drop pin 15 rests upon the terminal end 14*a* of the respective frame arm 14 to restrict the vertical distance that the deflector 16 is spaced from the distal outlet 13*b* of the body 13. As should be understood by those of ordinary skill in the art, the sprinkler head 100 may be configured to be permanently positioned in the extended operational position.

As shown, the concealing cup 11 takes the shape of a substantially cylindrical cup, but the disclosure is not so limited. The concealing cup 11 may include a proximal, generally horizontal wall 11*a* radially or otherwise horizontally outwardly projecting from the body 13, having a skirting side wall 11*b* extending axially distally therefrom. The concealing cup 11 defines an open distal end with a flange 12, extending radially outwardly at substantially a right angle from the distal end of the side wall 11*b*, but the disclosure is not so limited.

A removable cover plate 18 is attached to the concealing cup 11. In one configuration, as shown in FIG. 3, the removable cover plate 18 may be dome or frustoconical shaped. The dome or frustoconical shaped cover plate 18 may be dimensioned to enclose at least the drop pins 15 and the deflector 16 in the extended operational position of the sprinkler head 100. The removable cover plate 18 may be welded onto the concealing cup 11, such as onto the flange 12. The flange 12 may also, or alternatively, be used for mounting purposes. The welding material (e.g., solder) may have a sufficiently low melting point (e.g., but not limited to, approximately 100° F.—approximately 120° F.) such that when the cover plate 18 is heated to or above the melting point of the welding material, the cover plate 18 simply drops off the concealing cup 11, exposing the (extended) sprinkler head 100 (i.e., the drop pins 15 and the deflector 16, and in some variations, at least a portion of sprinkler head frame 10) positioned in the extended operational position. Optionally, the cover plate 18 may be snapped or otherwise removably attached to a flange 12, and flange 12 may be welded to the concealing cup 11. In this variation, when the temperature reaches or exceeds the melting point of the welding material, the flange 12 and the cover plate 18 may both fall off.

Figure 4A:
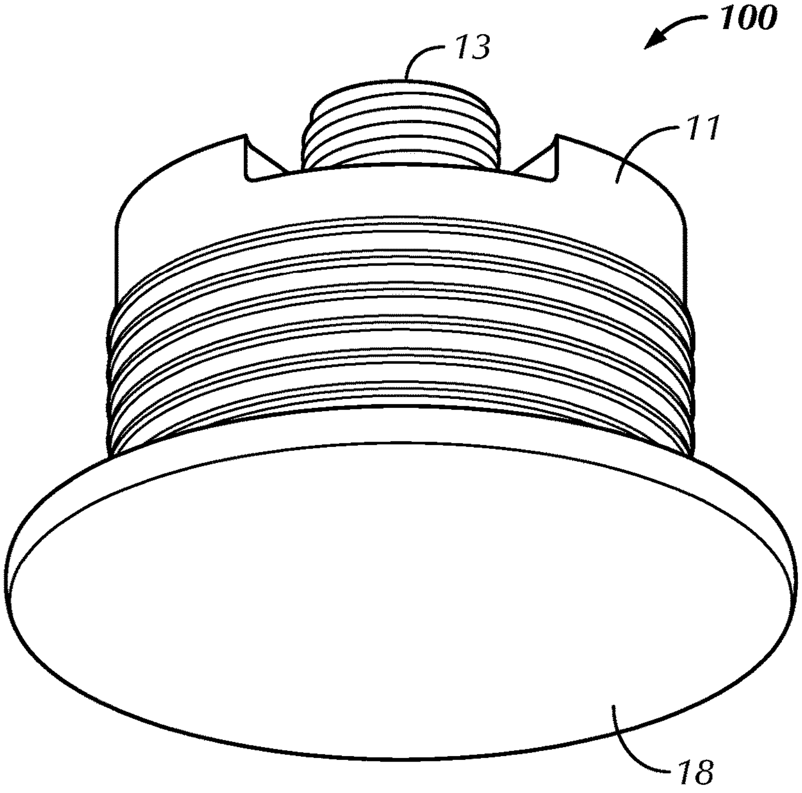
FIG. 4A is a bottom and side perspective view of the concealable sprinkler head of FIG. 2, with a flat removable cover, in the compressed, non-activated position.
Figure 4B:
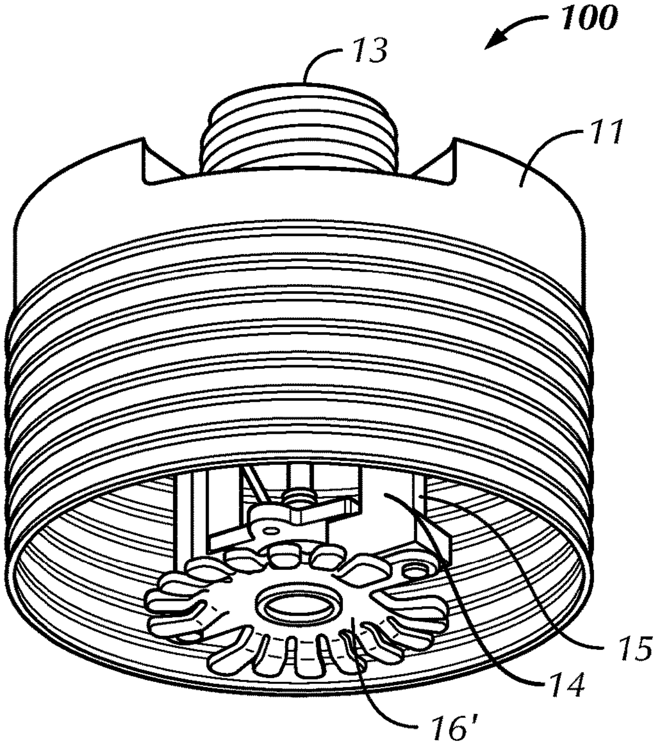
FIG. 4B is a bottom and side perspective view of the concealable sprinkler head of FIG. 2 in the compressed, non-activated position, with an exemplary deflector and with the removable cover removed.

As shown in FIG. 4A, the removable cover plate 18 may alternatively be substantially flat or slightly dome-shaped. In such a configuration, the removable cover plate 18 may support the sprinkler head 100 in the compressed, non-activated position thereof, e.g., elevationally supports the deflector 16' (or another deflector employed) thereupon. That is, because the sprinkler head 100 may be substantially compressed in the non-activated position, the cover plate 18 need not protrude as much as shown in FIG. 3. The cover plate 18 may again be welded onto the concealing cup 11, e.g., onto a flange 12, as shown in FIG. 2, or via at least one vertical protrusion (not shown) that fits against and may be welded onto the concealing cup 11 (such an arrangement is also possible in the variation shown in FIG. 3). Again, the welding material used to attach cover plate 18 may have a melting point (e.g., but not limited to, approximately 100° F.—approximately 120° F.), the weld(s) may melt, and cover plate 18 may drop off. This, in turn, may permit the drops pins 15 and deflector 16/16' to slide/extend downward from the compressed, non-activated position to the extended operational position. Once again, if the temperature in the sprinkler head 100 meets or exceeds a predetermined temperature, as previously described, water/fluid may be permitted to flow onto deflector 16 (or another deflector employed).

Turning back to FIG. 2, the deflector 16 may be shaped in the form of a directional deflector, which may direct a spray of water/fluid onto a window 2. As shown in FIG. 2, the deflector 16 includes a generally planar horizontal surface 16*a*, defining a circular segment in shape. As shown the drop pins 15 are fixedly secured, in a manner well understood by those of ordinary skill in the art, to the horizontal surface 16*a* and extend substantially orthogonally therefrom. The arcuate portion of the periphery of the horizontal surface 16*a* may be defined by a plurality of radially directed tines 16*c*. An inclined surface 16*b* extends angularly upwardly at an angle of about 60 degrees, i.e., toward the frame arms 14, from a substantially linear side, e.g., such as a chord of a circle, of the periphery of the horizontal surface 16*a*, although angles of up to approximately 90 degrees are feasible. The inclined surface 16*b* may also define a circular segment in shape, i.e., having an arcuate peripheral portion connected by a substantially linear peripheral portion, e.g., such as a chord of a circle. In one configuration, the horizontal surface 16*a* may define a major segment of a circle and the include surface 16*b* may define a minor segment of the circle.

Figure 5:
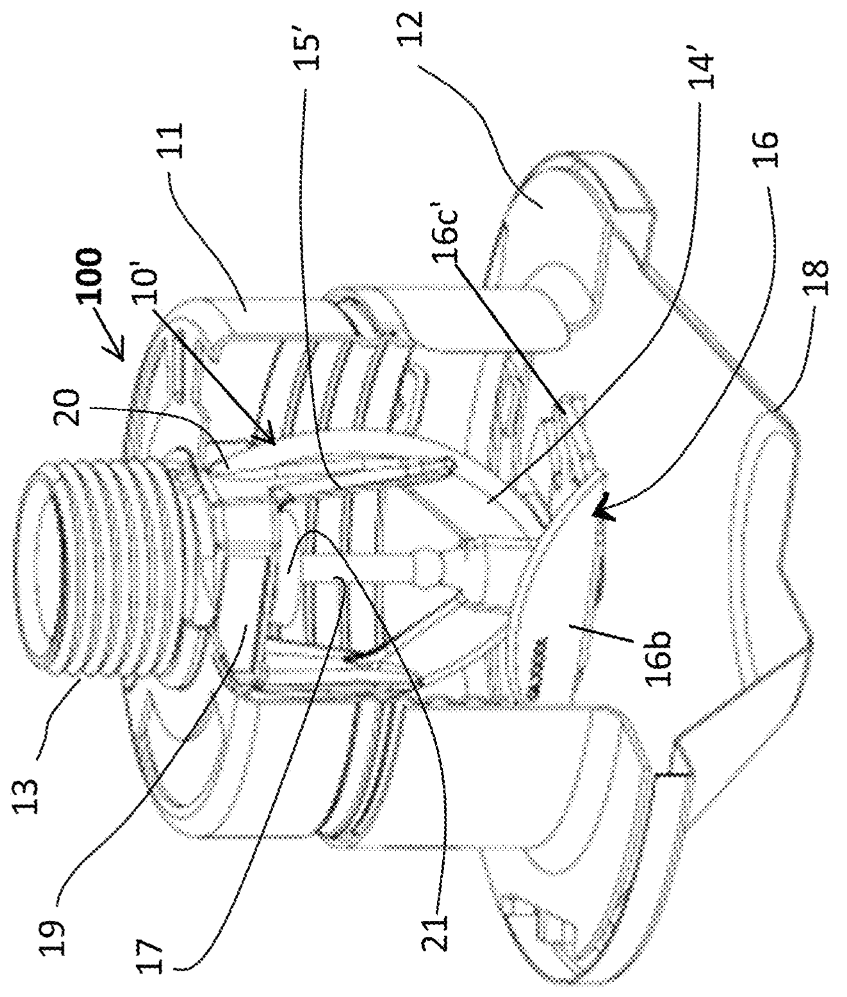
FIG. 5 is a top and side perspective cutaway view of the concealable sprinkler head of FIG. 2, with and alternative sprinkler frame and deflector.

Optionally, as shown in FIG. 5, at least one of the tines 16*c* of the horizontal surface 16*a* may also be angled upwardly, i.e., in the same direction as the inclined surface 16*b*. In the illustrated configuration of FIG. 5, the angled tine 16*c'* is positioned proximate/adjacent the inclined surface 16*b*. A second angled tine (not shown), mirroring the angled tine 16*c'* may also be angled upwardly. In the illustrated configuration, the angled tine(s) 16*c'* are less angled than the inclined surface 16*b*, but the disclosure is not so limited. The inclined surface 16*b* and angled tines 16*c'* may cooperate to form a raised portion of the deflector substantially defining a 'U' shape.

FIG. 5 also illustrates an optional alternative sprinkler frame 10' configuration employable in a concealable sprinkler head 100. The components of concealable sprinkler head 100 of FIG. 5 are similar to those of the previous FIGS. Therefore, the description of certain similarities and modes of operation therebetween may be omitted herein for the sake of brevity and convenience, and, therefore, is not limiting.

In the previous examples, e.g., such as shown in FIG. 2, the sprinkler frame 10 may be fixed within the concealing cup 11, and the drop pins 15 may be housed within the sprinkler frame 10 until circumstances, as previously described, permit the drop pins 15 to drop down. In FIG. 5, the sprinkler frame 10' itself is not fixed to the body 13, but rather is vertically movable, and may directly support the deflector 16 (or another deflector employed), i.e., the deflector 16 may be directly attached to the frame arms 14'. Rather than employing drop pins 15, FIG. 5 shows jointed arms 15' that are fixedly attached at one end to a portion 19 of the concealing cup 11 and fixedly attached at a second end to top, proximal portions 20 of the frame arms 14' of the sprinkler frame 10'. Jointed arms 15' may be attached to the top portions 20 of sprinkler frame 10' so as to permit the jointed arms 15' to swivel with respect to the top portions 20 of sprinkler frame 10'.

As previously described, when the temperature reaches or exceeds the melting point of the welding material attaching the cover plate 18 to the flange 12 or the flange 12 to the concealing cup 11, the welded parts may then drop off, exposing the internal mechanism. Unlike the previously described examples, however, the sprinkler frame 10' may not immediately drop down. Rather, the jointed arms 15' may be configured to hold the sprinkler frame 10' in a retracted position, as shown in FIG. 5, until the temperature is sufficient to trigger the thermal trigger 17 to shrink, shatter or melt. Thereafter, the sealing plug 21, which may serve to prevent water/fluid flow out of body 13, now without the presence of the thermal trigger 17 to hold it in place, may be dislodged from the distal end 13*b* of the body 13, permitting water/fluid to flow downward. The resulting combined downward forces of gravity and water/fluid flow may then be sufficient to cause the jointed arms 15' to straighten, thus permitting the frame 10' and the attached deflector 16 to drop down into an extended operational position for deflecting water/fluid onto a window 2. Alternatively, the embodiment shown in FIG. 5 may describe a sprinkler where the jointed arms 15' and the frame arms 14' instead form a rigid assembly. In such an embodiment, the frame arms 14' are preferably long enough to position the deflector 16 within the dome of cover plate 18, which conceals the sprinkler from view. As previously described, when the temperature reaches or exceeds the melting point of the welding material attaching the cover plate 18 to the flange 12 or the flange 12 to the concealing cup 11, the welded parts may then drop off, exposing the deflector 16 and the remainder of the sprinkler head 100. A further increase in temperature beyond the rating of thermal trigger 17, causes it to shrink, break, or otherwise separate, thus releasing the pressure keeping the sealing plug 21 in place, and thereby permitting the water (or other fluid) to flow onto the deflector 16.

Figure 6B:
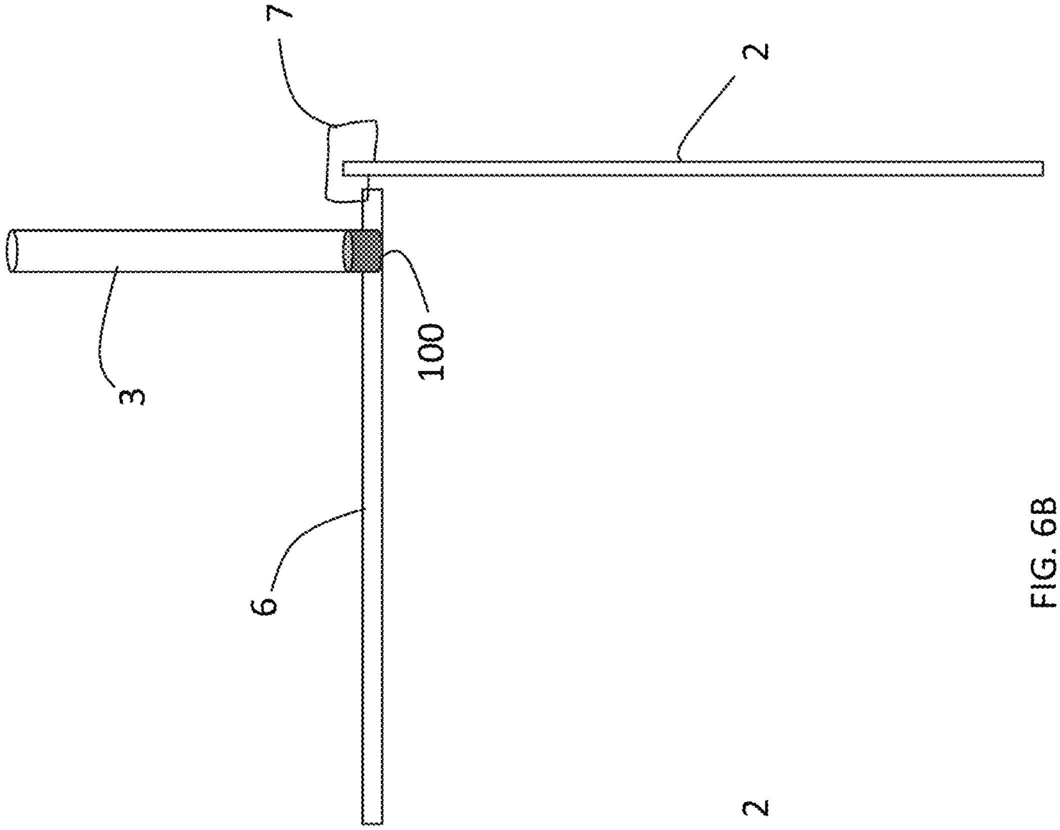
FIG. 6B is a side schematic view of an alternative installation of the concealable sprinkler head of FIG. 2.
Figure 6A:
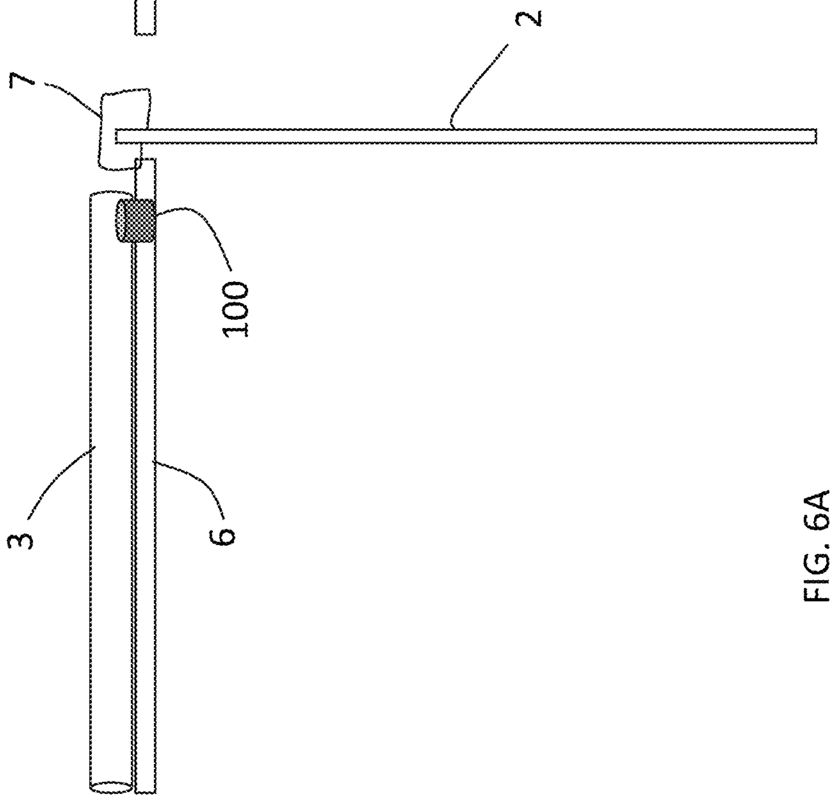
FIG. 6A is a side schematic view of an installation of the concealable sprinkler head of FIG. 2.

FIGS. 6A and 6B illustrate two examples of how a concealable sprinkler head 100 may be mounted, according to various aspects of the present disclosure. In FIG. 6A, the pipe 3 may be oriented in a substantially horizontal direction, above the ceiling 6. Alternatively, as shown in FIG. 6B, the pipe 3 may be oriented vertically. The concealable sprinkler head 100 may be mounted in the ceiling 6 and attached to the pipe 3 via the body 13. In the vertical orientation, the body 13 of the sprinkler head 100 may be attached directly to the end of the pipe 3, or if the sizes of the body 13 and the pipe 3 do not match, an appropriate fitting may be utilized. As should be understood by those of ordinary skill in the art, a mounting bracket (not shown) may be used for securing the concealable sprinkler head 100 to the ceiling 6, or a flange 12 may be utilized for this purpose (such a protrusion may include, e.g., holes for fastening it to the ceiling 6). The concealable sprinkler head 100 may be spaced horizontally from the window 2 such that it is at an appropriate distance from window 2 and elevationally at or below window frame 7 (when the mechanism of the concealable sprinkler head 100 is in an extended position) such that the spray of water/fluid is directed onto the window 2. It is also contemplated that other configurations of pipes may be used. For example, a vertical pipe may be connected to a cross fitting, and the concealable sprinkler head may be connected to a bottom branch of the cross fitting, while the side branches may allow horizontal pipes to be connected, e.g., for further distribution of water/fluid. In general, any pipe configuration that may permit concealable sprinkler head 100 to be connected may be utilized.

FIGS. 7A-9B illustrate a second embodiment of a concealable sprinkler head 1000 and accompanying deflector 160. The reference numerals of the second embodiment are generally distinguishable from those of the above-described first embodiment configurations (FIGS. 2-6B) by a factor of one hundred (100), but otherwise indicate the same elements as indicated above, except as otherwise specified. The concealable sprinkler head 1000 of the present embodiment is similar to that of the first embodiment configurations. Therefore, the description of certain similarities and modes of operation between the embodiments may be omitted herein for the sake of brevity and convenience, and, therefore, is not limiting.

Figure 7A:
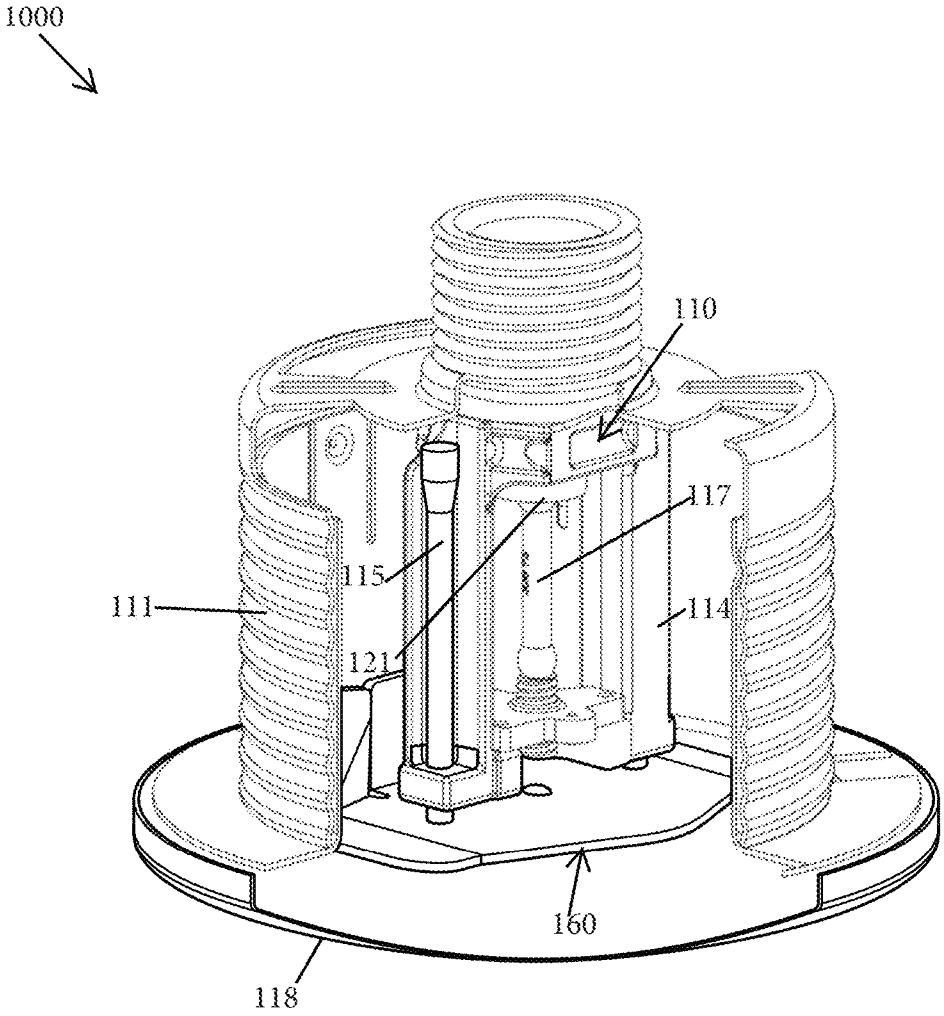
FIG. 7A is a top and side perspective cutaway view of a portion of a concealable sprinkler head oriented in the compressed, non-activated position, according to a second embodiment of the disclosure.
Figure 7B:
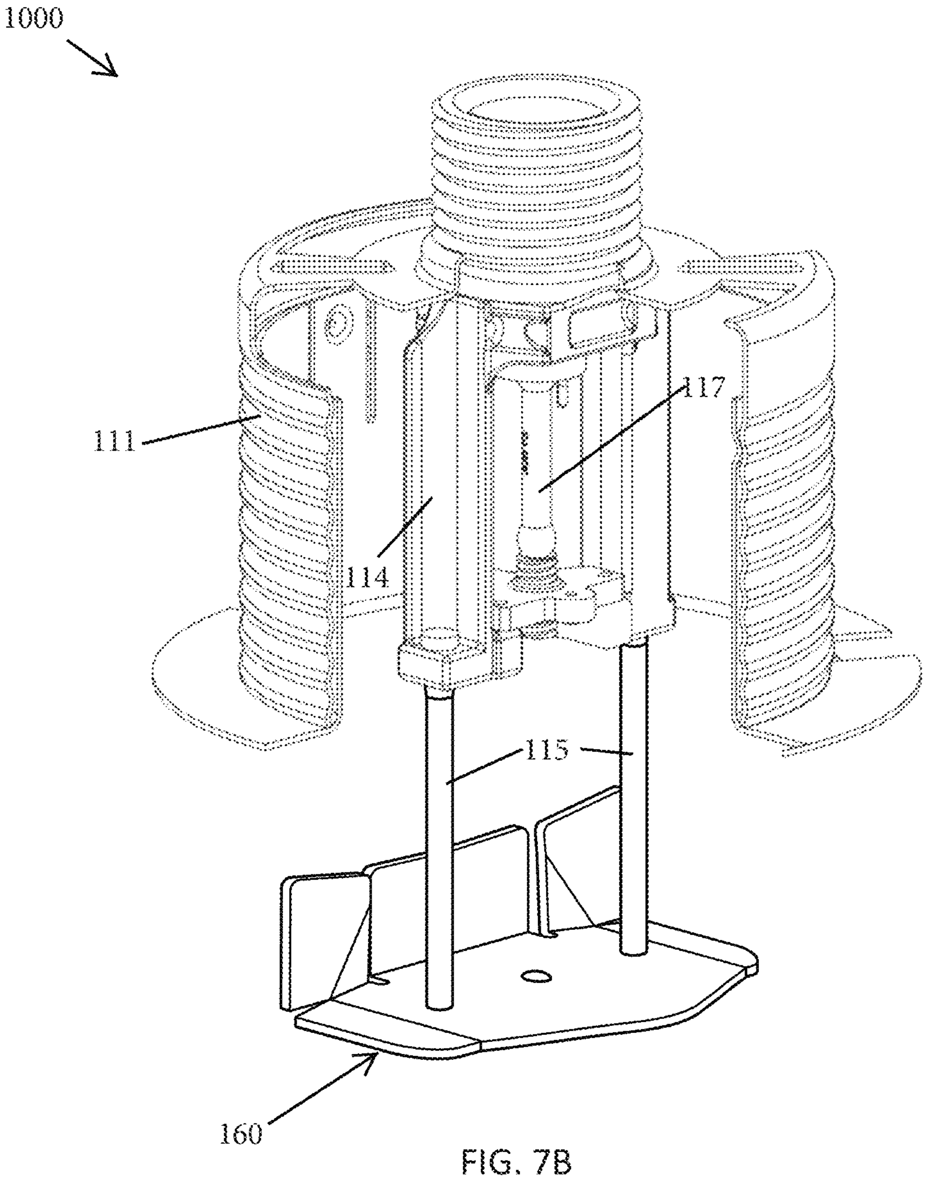
FIG. 7B is a top and side perspective cutaway view of a portion of the concealable sprinkler head of FIG. 7A, oriented in the extended operational position.

FIGS. 7A and 7B illustrate the concealable sprinkler head 1000 in the compressed non-activated position and the extended operational position, respectively. Similarly to the sprinkler head 100, the sprinkler head 1000 includes a sprinkler frame 110, a fluid deflector 160, a heat sensor/thermal trigger 117 supporting a sealing plug/cap 121, a concealing cup 111 and a removable cover plate 118. In the illustrated embodiment, the thermal trigger 117 takes the form of a glass-bulb type trigger, but the disclosure is not so limited. In one non-limiting configuration, the glass bulb 117 has a temperature rating between approximately 100° F. and approximately 225° F., such as, for example, approximately 155° F. and 200° F. In one non-limiting configuration the sprinkler head 1000 is configured to operate at a water pressure between approximately 7 psi and approximately 300 psi, such as, for example, between approximately at 10 psi and approximately 175 psi. The drop pins 115, which secure the deflector 160, are in slidable engagement with the frame arms 114, to enable the concealable sprinkler head 1000 to deploy, i.e., drop down, from the compressed, non-activated position (FIG. 7A) to the extended operational position (FIG. 7B) when the removable cover plate 118 falls off (as previously described). In the illustrated embodiment of FIGS. 7A, 7B, the removable cover plate 118 is substantially flat or slightly dome-shaped, but the disclosure is not so limited.

Referring now to FIGS. 8A-8D, a primary difference between the concealable sprinkler head 1000 of the second embodiment and the concealable sprinkler head 100 of the first embodiment pertains to the deflector 160. The deflector 160 includes a generally horizontal surface 160*a* having three generally planar portions 160*d*, 160*e* and 160*f*. The portion 160*d* is a central, horizontal portion, bookended by the side portions 160*e* and 160*f*. In the illustrated embodiment, the side portions 160*e* and 160*f* mirror one another on opposite sides of the central portion 160*d* and are directly connected thereto, but the disclosure is not so limited. The side portions 160*e*, 160*f* may each be coplanar with the central portion 160*d* or may alternatively incline/angle downwardly from the central portion 160*d*, e.g., angled away from the frame arms 114, by an included angle θ (see FIG. 8B), which may, in one configuration, be between approximately 160° and approximately 180° (when coplanar with the central portion 160*d*), such as, for example, between approximately 168° and approximately 175°.

In the illustrated embodiment, the central portion 160*d* is approximately between four times (4×) to approximately five times (5×) as wide (in the lateral direction) as each of the side portions 160*e*, 160*f*. The central portion 160*d* of the generally horizontal surface 160 includes a hemispherical projection 160*g* located approximately midway between the opposing side portions 160*e*, 160*f*. The projection 160*g* is generally axially aligned with the internal passageway of the body 113 of the sprinkler frame 110 and assists in substantially equally distributing the fire suppression liquid, e.g., water, about the deflector 160 when contacted by the fire suppression liquid flowing down from the internal passageway of the body 113. In one configuration, the hemispherical projection 160*g* may define a diameter between approximately two times (2×) and approximately six times (6×) the axial thickness of the central portion 160*d*, such as, for example, approximately four times (4×) the axial thickness of the central portion 160*d*. In the illustrated embodiment, the generally horizontal surface 160*a* defines a front surface contour in the form of an arcuate apex with linear slanted surfaces, but the disclosure is not so limited. For example, without limitation, the front surface contour may alternatively take a triangular or semi-circular contour. The slanted surfaces of the front surface contour of the generally horizontal surface 160*a* are angled from a central axis A of the central portion 160*d* by an angle α (see FIG. 8A), which may, in one configuration, be between approximately 102° and approximately 115°, such as, for example between approximately 105° and approximately 110°.

The deflector 160 further includes an inclined surface 160*b* extending angularly upwardly, i.e., toward the frame arms 114, from the rear surface of the generally horizontal portion 160*a*. In the illustrated embodiment, the inclined surface 160*b* includes three discrete portions 160*h*, 160*i*, 160*j*, i.e., laterally spaced apart from one another, but the disclosure is not so limited. As shown, the central segment 160*h* is wider than each of the side ears 160*i*, 160*j* on either side thereof. In one configuration, the width X of each of the side ears 160*i*, 160*j* (measured in the plane of the central segment 160) is between approximately 60% and approximately 80% of the width L of the central segment 160*h* 160*j* (measured in the plane of the central segment 160), such as, for example, between approximately 67% and approximately 73%. As shown best in FIG. 8C, the central segment 160*h* is retracted further backward relative to the opposing side ears 160*i*, 160*j*. The central segment 160*h* is oriented substantially orthogonally to the central portion 160*d* of the generally horizontal surface 160*a*.

The central segment 160*h* is generally rectangular in shape and extends in a plane generally perpendicular to the central axis A and generally parallel to the portion of the rear surface of the central portion 160*d* of the generally horizontal surface 160 attached thereto. In the illustrated embodiment, the central segment 160*h* includes generally rounded upper corners, but the disclosure is not so limited. In the illustrated embodiment, the contour of the upper surface 160*h*1 of the central segment 160*h* takes the shape of a wide V, but may alternatively be linear. The upper surface 160*h*1 of the central segment 160*h* may define an included angle € (see FIG. 8B), which may, in one configuration, be between approximately 170° and approximately 180° (when linear), such as, for example, approximately 174°.

Figure 8A:
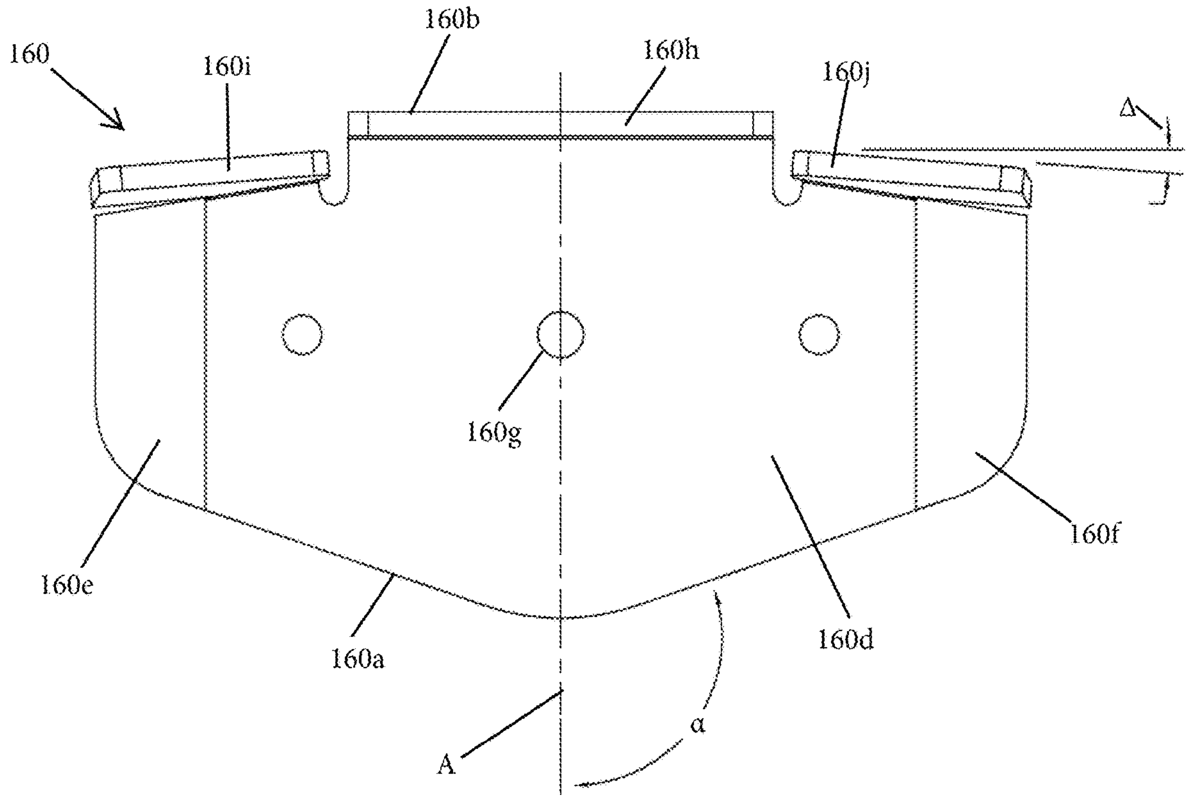
FIG. 8A is a top plan view of the deflector of the concealable sprinkler head of FIG. 7A.
Figure 8B:
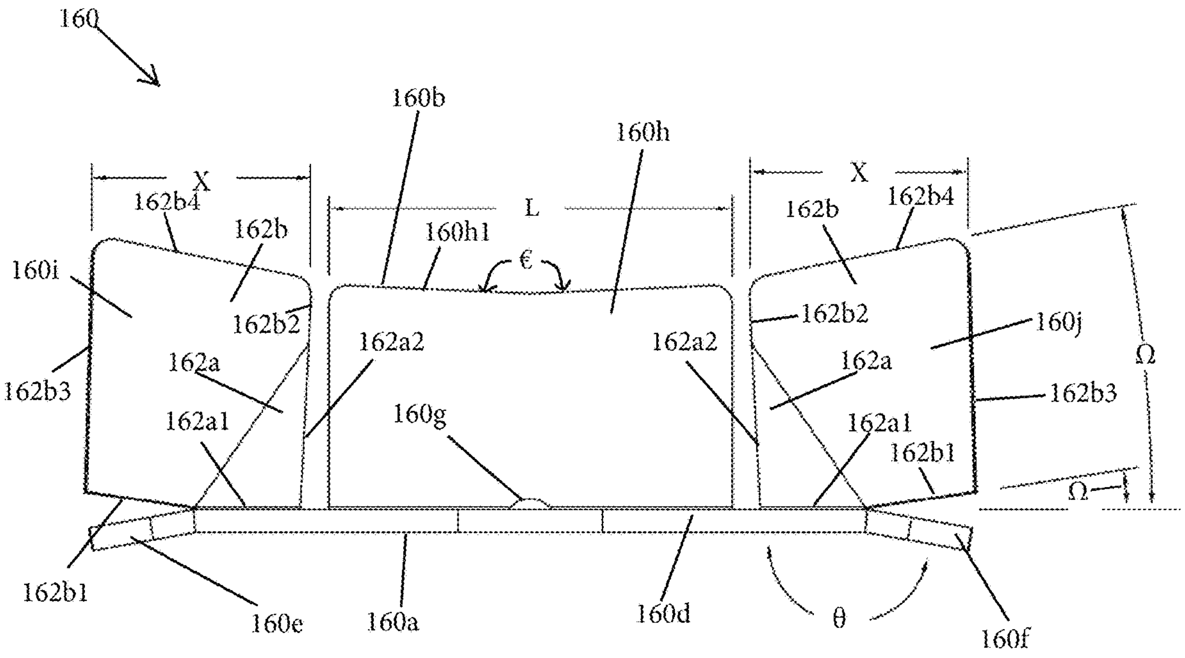
FIG. 8B is a front elevational view of the deflector of FIG. 8A.
Figure 8C:
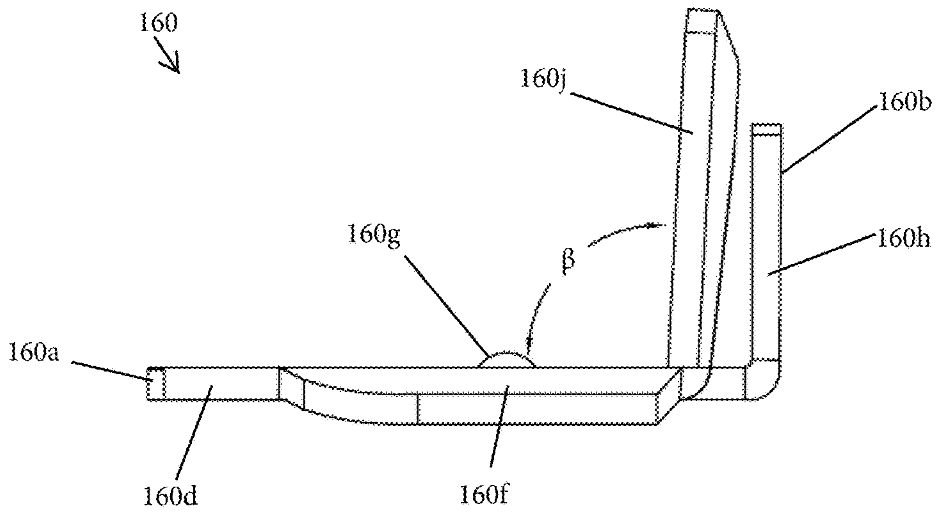
FIG. 8C is a left side elevational view of the deflector of FIG. 8A.
Figure 8D:
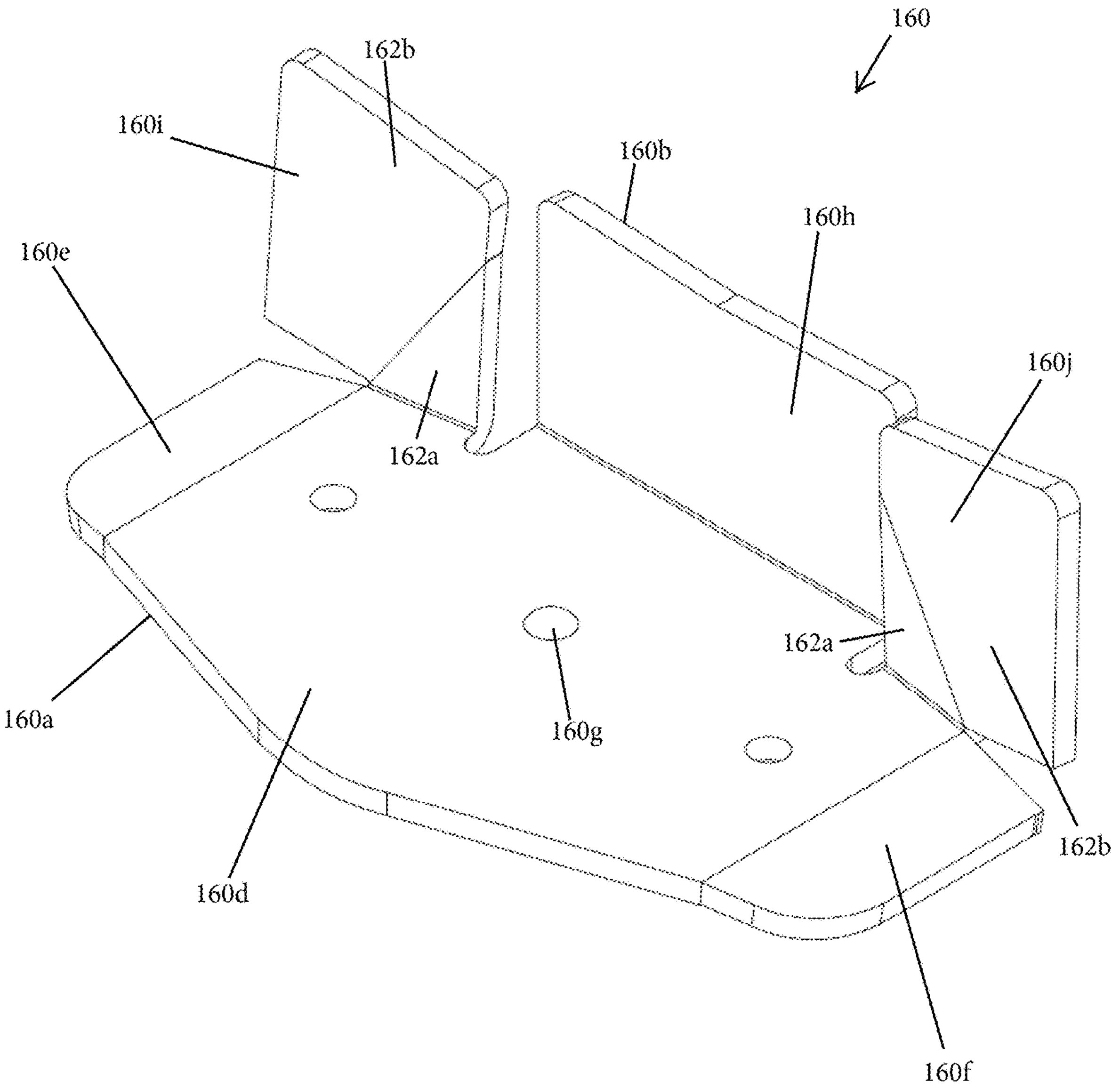
FIG. 8D is a top and left side perspective view of the deflector of FIG. 8A.

As shown best in in FIGS. 8B, 8D, each of the opposing side ears 160*i*, 160*j* defines two regions 162*a*, 162*b*, integral, i.e., formed from a single structure, with one another. The smaller region 162*a* is generally triangular in shape, e.g., such as a right triangle, wherein a base surface 162*a*1 of each of the smaller regions 162*a* defines the portion of the respective side ear 160*i*, 160*j* attached to the generally horizontal surface 160*a*. In the illustrated embodiment, the base surface 162*a*1 of each of the smaller regions 162*a* is attached to a portion of the rear surface of the central portion 160*d* of the generally horizontal surface 160*a*, but the disclosure is not so limited. A side surface 162*a*2 of each of the smaller regions 162*a* defines a portion of an inner side surface of the respective side ear 160*i*, 160*j*, i.e., that is more proximate to the central axis A. Similarly to the central segment 160*h*, each of the smaller regions 162*a* of the respective side ears 160*i*, 160*j* is oriented substantially orthogonally to the central portion 160*d* of the generally horizontal surface 160*a*.

The larger region 162*b* of each of the side ears 160*i*, 160*j* includes an inner side surface 162*b*2 contiguous and substantially coaxial with the side surface 162*a*2 of the corresponding smaller region 162*a* that is more proximate to the central axis A. The larger region 162*b* of each of the side ears 160*i*, 160*j* also includes an opposing outer side surface 162*b*3 that defines an entirety of the outer side surface of the respective side ears 160*i*, 160*j*. The corresponding inner and outer side surfaces of the side ears 160*i*, 160*j* extend substantially parallel with one another. As shown best in FIGS. 8B, 8D, the upper and lower surfaces 162*b*4, 162*b*1 of the larger region 162*b* of each of the side ears 160*i*, 160*j* are also substantially parallel with one another. The upper surface 162*b*4 of the larger region 162*b* of each of the side ears 160*i*, 160*j* defines an entirety of the upper surface of the respective side ear 160*i*, 160*j*, and, in the illustrated configuration, defines rounded upper corners, but the disclosure is not so limited. The lower surface 162*b*1 of the larger region 162*b* of each of the side ears 160*i*, 160*j* is contiguous with the base surface 162*a*1 of the corresponding smaller region 162*a*.

In one configuration, the upper and lower surfaces 162*b*4, 162*b*1 of the larger region 162*b* of each of the side ears 160*i*, 160*j* may also extend parallel with the central portion 160*d* of the generally horizontal surface 160*a*. In such a configuration the base surface 162*a*1 of the smaller region 162*a* and the lower surface 162*b*1 of the corresponding larger region 162*b* are also coaxial with one another. Alternatively, as shown in FIG. 8B, the upper and lower surfaces 162*b*4, 162*b*1 of the larger region 162*b* of each of the side ears 160*i*, 160*j* may be upwardly inclined relative to the central portion 160*d* of the generally horizontal surface 160*a* (and relative to the base surface 162*a*1 of the corresponding smaller region 162*a*) at an acute included angle Q. The angle Q may be between approximately 0° (when parallel with the central portion 160*d* and coaxial with the base surface 162*a*1 of the corresponding smaller region 162*a*) and approximately 20°, such as, for example, between approximately 5° and approximately 12°.

The larger region 162*b* of each of the side ears 160*i*, 160*j* may also be oriented substantially orthogonally to the central portion 160*d* of the generally horizontal surface 160*a* or may be angled away from the central portion 160*d* by an included angle β (see FIG. 8C), which may, in one configuration, be between approximately 90° (when orthogonal) and approximately 95°, such as, for example, between approximately 91° and approximately 94°. The larger region 162*b* of each of the side ears 160*i*, 160*j* is also angled/pivoted inwardly toward the central axis A from the plane of the central segment 160*h* by an angle Δ (see FIG. 8A), which may, in one configuration, be between approximately 5° and approximately 20°, such as, for example, between approximately 7° and approximately 12°. The inward angle of the respective larger region 162*b* of each of the side ears 160*i*, 160*j* enables the inclined surface 160*b* to cooperate with the other surfaces of the deflector 160 to direct fire suppression liquid in a generally convergent and consistent forward manner sufficient to adequately wet the protected glazing over a span of up to six feet (6') to either side of axis A, and at least prevent the spray of fire suppression liquid in a divergent or inconsistent forward manner.

Figure 9A:
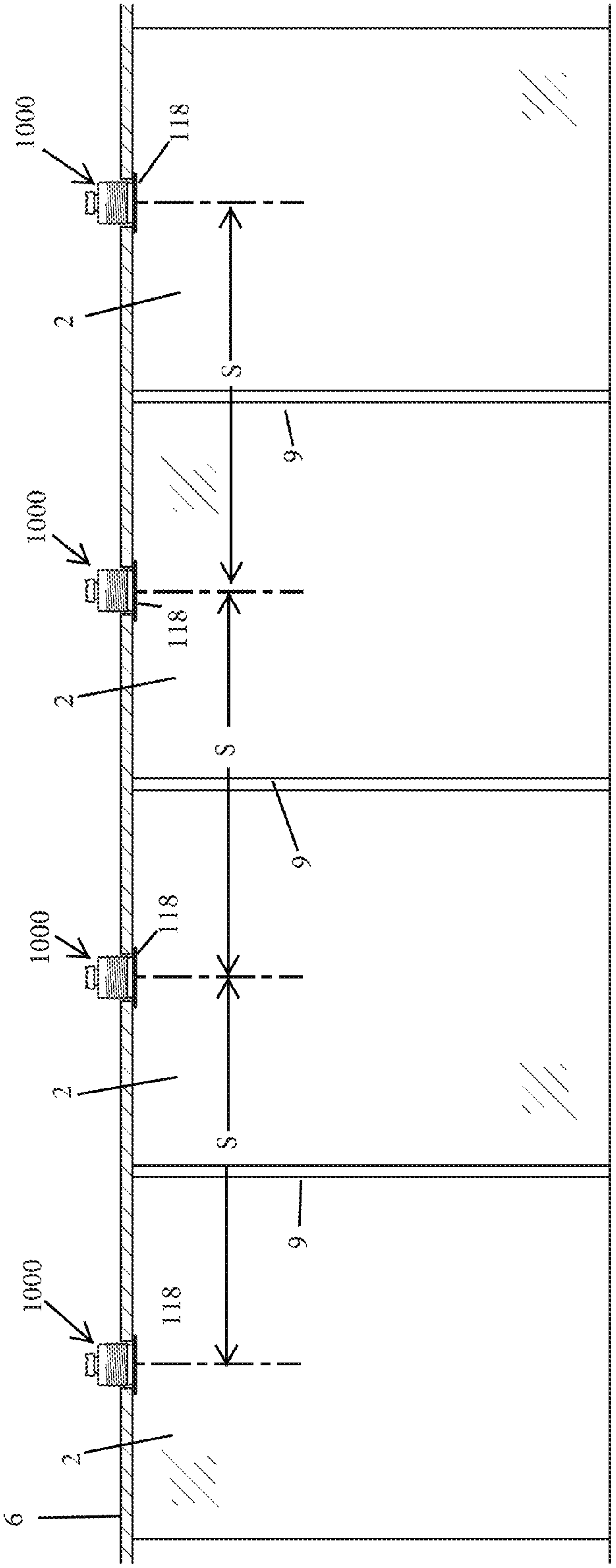
FIG. 9A is a front plan view of an installation of the concealable sprinkler head of FIG. 7A.
Figure 9B:
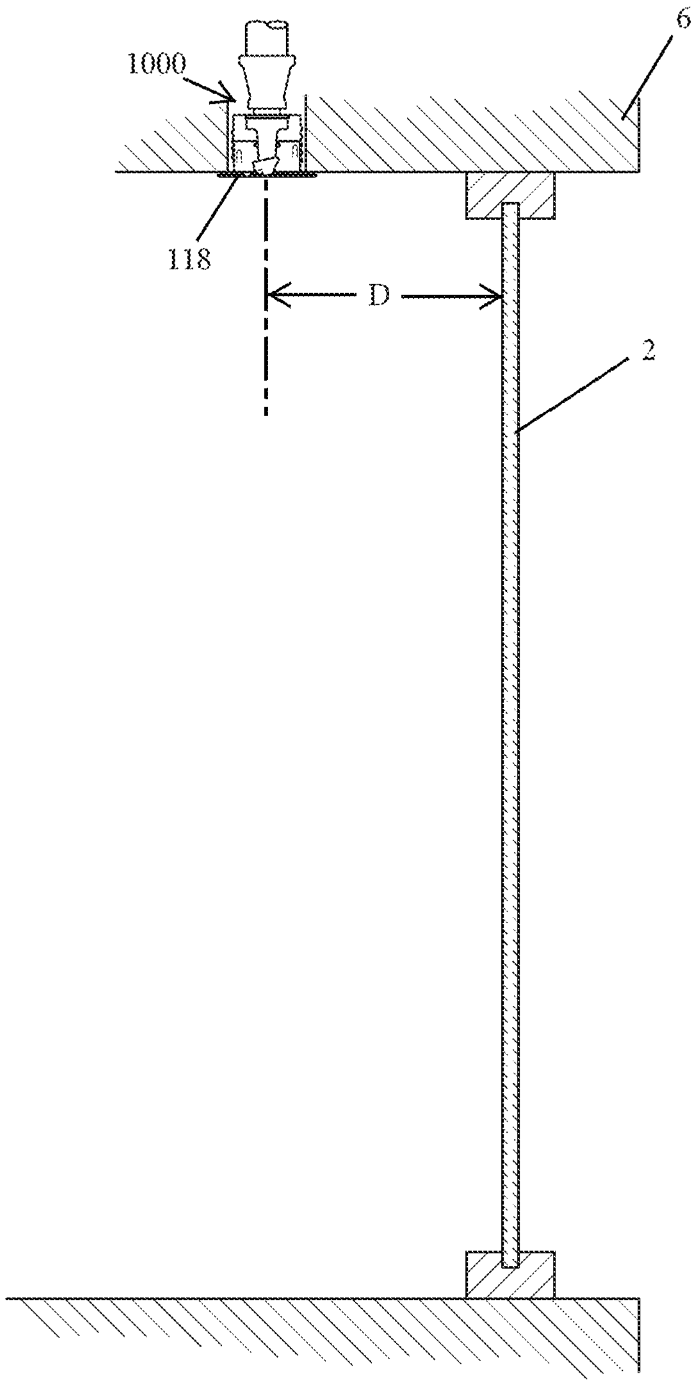
FIG. 9B is a side elevational view of the installation of FIG. 9A.

Similar to the previous installation description with respect to FIGS. 6A, 6B, and as shown in FIGS. 9A, 9B, concealable sprinkler heads 1000 are mounted in a pendent position proximate a partition wall or window 2 between spaces, wherein the wall or window 2 is significantly or primarily constructed of, or occupied by, glass. In some designs, the glass wall or window 2 may include several windows 2 connected together by butt joints or mullions 9. The sprinkler heads 100 are mounted in the ceiling 2 adjacent, and often perpendicular, to the glass partition wall or window 2. As should be understood by those of ordinary skill in the art, the sprinkler heads 1000 are mounted such that a plane extending between the frame arms 114 is parallel to the glass partition wall or window 2 and the inclined surface 160*b* is a rear surface relative to the glass partition wall or window 2. A network of pipes 3 (see FIGS. 6A, 6B) within or above the ceiling 6 are fluidly connected to the sprinkler heads 1000. As shown in FIGS. 9A, 9B, the sprinkler heads 1000 are mounted in the compressed, non-activated orientations thereof, such that the corresponding cover plates 118 are positioned against/underlying the ceiling 2, thereby obscuring the sprinkler heads 1000. As shown in in FIG. 9B, each sprinkler head 1000 is spaced a respective distance D from the window 2, which, in one configuration is between approximately four inches (4") and approximately twelve inches (12") from the surface of the window 2. As shown in FIG. 9A, each sprinkler head 1000 is spaced a distance S from the neighboring sprinkler head(s) 100, which, in one configuration, is between approximately six feet (6') and approximately twelve feet (12') apart.

The acceptance criteria for the use of glazing partition assemblies and window assemblies protected by sprinklers, in particular specific application window sprinklers, including the concealable sprinkler heads 100, 1000, is as an alternative to the use of approved fire-rated assemblies (such as approved two-hour rated glazing) under building codes. In particular, building codes, such as Section 104 of the International Building Code (IBC), 2009 revision, permits building officials and authorities having jurisdiction to employ approved alternative materials, equipment, and methods of construction and design, which includes the use of automatic sprinklers with glazing that is not fire-rated to achieve an equivalent rating. Acceptance is determined by empirical fire testing that complies with the intent of the building code standards, including standards such as ASTM E119: Standard Methods for Fire Tests of Building Construction and Materials, and ULC/ORD-C263.1-99 (R2018), each of which is incorporated by reference herein in its entirety. The testing generally consists of a closed room containing a linear burner situated parallel to one wall, a glazing assembly opposite the burner, and an exhaust opening. At least nine protected thermocouples are located within the room, and the furnace is first calibrated by controlling and monitoring the gas flow rates such that the thermocouples report a time and temperature curve as required by the relevant standard with a conventional fire rated wall assembly fixed in place of the glazing (such a fire rated wall assembly commonly comprises a two-hour fire rated wall assembly made of wood or metal studs with two layers of gypsum board affixed to either side of the studs). For instance, two points on the ASTM E119 time-temperature curve are that the temperature will be 1700 F at 1:00 h and 1850 F at 2:00 h.

After the calibration procedure, a test glazing assembly is then installed, with the test sprinklers mounted in pendent orientation four to twelve inches (4"-12") from the glazing, and the test is run using the same gas flow rates and time as recorded and employed during calibration. Thermocouples are mounted to both sides of the glazing. The test duration is typically two hours, in order to demonstrate equivalency to a two-hour fire rated glazing. A minimum acceptable test result is where the window unit remains intact for the two-hour period without the passage of flame or gasses hot enough to ignite a target substance (typically cotton waste), and where the thermocouples monitoring the temperature of the glazing opposite the automatic sprinklers do not record an increase in temperature more than 250° F. beyond their initial starting temperature. The maximum spacing between the sprinklers is determined in accordance with the test results, with higher-performing sprinklers being able to pass the test with greater spacing between the sprinkler heads. Advantageously, the concealable sprinkler head 1000, employing a deflector 160 in the configurations previously described, passed the above testing criteria at a spacing S of up to approximately twelve feet (12') between sprinkler heads 1000 (as previously described). The minimum sprinkler head spacing is approximately six feet (6') as determined by testing in accordance with UL199, to prevent the spray from one sprinkler head from cooling the adjacent sprinkler head, thereby preventing it from discharging (a phenomenon known as cold-soldering).

It will be appreciated by those skilled in the art that changes could be made to the embodiments described above without departing from the broad inventive concepts thereof. It is understood, therefore, that this invention is not limited to the particular embodiments disclosed, but it is intended to cover modifications within the spirit and scope of the present disclosure, as set forth in the appended claims.

We claim:

1. A concealable sprinkler head comprising:
- a sprinkler frame comprising:
  - a body mountable to a fire suppression liquid source, the body defining a proximal inlet, a distal outlet and an internal fire suppression liquid passageway extending therethrough;
  - a pair of frame arms extending away from the body; and
  - a pair of corresponding drop pins each being slidably engaged with a respective frame arm;
- a sealing plug positioned in a sealing position to seal the internal fire suppression liquid passageway, maintaining the sprinkler head in a non-spraying state;
- a thermal trigger supported within the sprinkler frame and operatively engaged with the sealing plug and configured to release the sealing plug from the sealing position upon activation of the thermal trigger,
- a fluid deflector secured to the pair of drop pins;

a concealing cup having an upper wall attached to, and laterally outwardly projecting from, the body of the sprinkler frame, a skirting side wall extending away from the upper wall, and an open base end, the pair of frame arms being at least partially positioned within the concealing cup; and a cover plate attached to the concealing cup, covering at least a portion of the open base end of the concealing cup and maintaining the pair of drop pins and the fluid deflector in a compressed, non-activated position, wherein, in the compressed, non-activated position:

the fluid deflector includes an at least partially planar surface having a periphery, the pair of drop pins extending from the at least partially planar surface and defining an axis extending through the pair of drop pins, and an inclined surface extending angularly upwardly toward the sprinkler frame from a portion of the periphery of the at least partially planar surface located along one side of the axis, and at least a portion of the cover plate being removable from the concealing cup at a predetermined temperature, permitting the pair of drop pins and the deflector to drop down relative to the compressed, non-activated position into an extended operational position wherein the inclined surface is configured to direct fire suppression liquid to an opposing side of the axis.

2. The concealable sprinkler head of claim 1, wherein the portion of the periphery of the at least partially planar surface of the fluid deflector from which the inclined surface extends is linear.

3. The concealable sprinkler head of claim 1, wherein the at least partially planar surface of the deflector defines a circular segment in shape.

4. The concealable sprinkler head of claim 1, further comprising a laterally outwardly extending flange mounted to the concealing cup and positioned proximate the open base end thereof, wherein the cover plate is welded to the flange with a welding material, the welding material having a predetermined melting point such that when the cover plate is heated to or above the melting point, the cover plate separates from the concealing cup.

5. The concealable sprinkler head of claim 1, wherein the at least partially planar surface of the fluid deflector and the inclined surface of the fluid deflector define an obtuse included angle therebetween.

6. The concealable sprinkler head of claim 1, wherein the upper wall of the concealing cup includes at least one aperture.

7. The concealable sprinkler head of claim 1, wherein the skirting side wall of the concealing cup includes an aperture.

8. The concealable sprinkler head of claim 1, wherein each of the drop pins includes a proximal flange that rests upon a terminal end of the corresponding respective frame arm in the extended operational position.

9. The concealable sprinkler head of claim 1, wherein the pair of frame arms are positioned within the concealing cup.

10. The concealable sprinkler head of claim 1, wherein the cover plate comprises a flanged member and a cover member, the flanged member being attached to the concealing cup and the cover member being welded onto the flanged member via a welding material having a melting point, wherein the melting point is the predetermined temperature and the cover member being configured to detach from the flanged member upon exceeding the melting point of the welding material.

11. A concealable sprinkler head comprising:

a sprinkler frame comprising:

a body mountable to a fire suppression liquid source, the body defining a proximal inlet, a distal outlet and an internal fire suppression liquid passageway extending therethrough;

a pair of frame arms extending away from the body; and a pair of corresponding drop pins each being slidably engaged with a respective frame arm;

a sealing plug positioned in a sealing position to seal the internal fire suppression liquid passageway, maintaining the sprinkler head in a non-spraying state;

a thermal trigger supported within the sprinkler frame and operatively engaged with the sealing plug and configured to release the sealing plug from the sealing position upon activation of the thermal trigger, a fluid deflector secured to the pair of drop pins, the fluid deflector including an at least partially planar surface having a periphery, the pair of drop pins extending from the at least partially planar surface and defining an axis extending through the pair of drop pins, and an inclined surface extending angularly upwardly toward the sprinkler frame from a portion of the periphery of the at least partially planar surface located along one side of the axis defined by the pair of drop pins, the inclined surface being configured to direct fire suppression liquid to an opposing side of the axis defined by the pair of drop pins;

a concealing cup having an upper wall attached to, and laterally outwardly projecting from, the body of the sprinkler frame, a skirting side wall extending away from the upper wall, and an open base end, the pair of frame arms being at least partially positioned within the concealing cup; and a cover plate attached to the concealing cup, covering at least a portion of the open base end of the concealing cup and maintaining the pair of drop pins and the fluid deflector in a compressed, non-activated position, at least a portion of the cover plate being removable from the concealing cup at a predetermined temperature, permitting the pair of drop pins and the deflector to drop down relative to the compressed, non-activated position into an extended operational position.

12. The concealable sprinkler head of claim 11, wherein the at least partially planar surface of the fluid deflector includes a conical portion projecting toward the body.

13. The concealable sprinkler head of claim 12, wherein the conical portion extends across the axis extending through the pair of drop pins.

14. The concealable sprinkler head of claim 11, further comprising a laterally outwardly extending flange mounted to the concealing cup and positioned proximate the open base end thereof, wherein the cover plate is welded to the flange with a welding material, the welding material having a predetermined melting point such that when the cover plate is heated to or above the melting point, the cover plate separates from the concealing cup.

15. The concealable sprinkler head of claim 11, wherein the pair of frame arms are positioned within the concealing cup.

16. The concealable sprinkler head of claim 11, wherein the upper wall of the concealing cup includes at least one aperture.

17. The concealable sprinkler head of claim 11, wherein each of the drop pins includes a proximal portion that rests upon a terminal end of the corresponding respective frame arm in the extended operational position.

18. The concealable sprinkler head of claim 11, wherein the cover plate comprises a flanged member and a cover member, the flanged member being attached to the concealing cup and the cover member being welded onto the flanged member via a welding material having a melting point, wherein the melting point is the predetermined temperature and the cover member being configured to detach from the flanged member upon exceeding a melting point of the welding material.

* * * * *